April 21, 1959 R. M. KENDIG 2,883,144
FLUID PRESSURE OPERATED FLOW CONTROL VALVE DEVICE
Filed Jan. 24, 1957
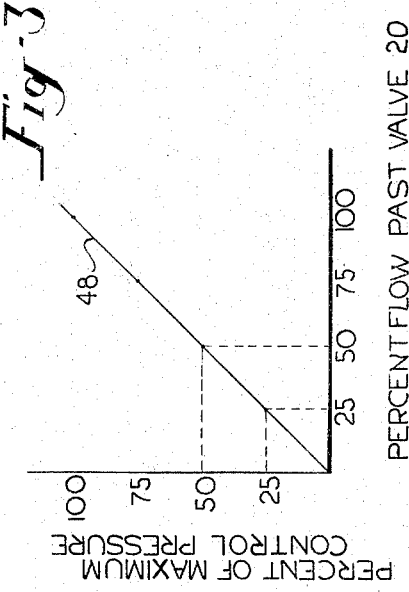
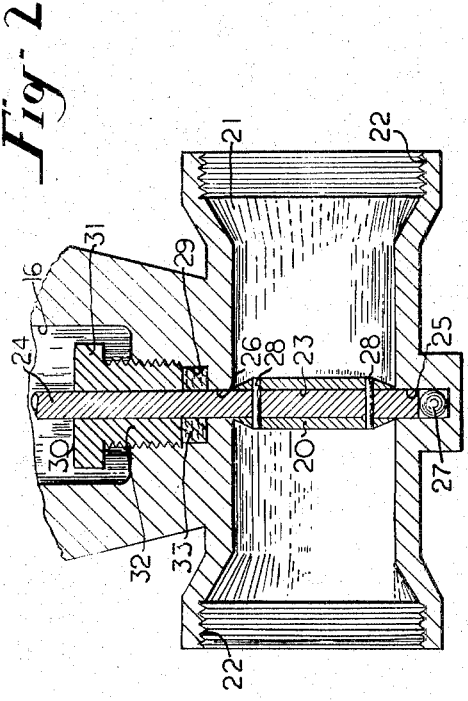
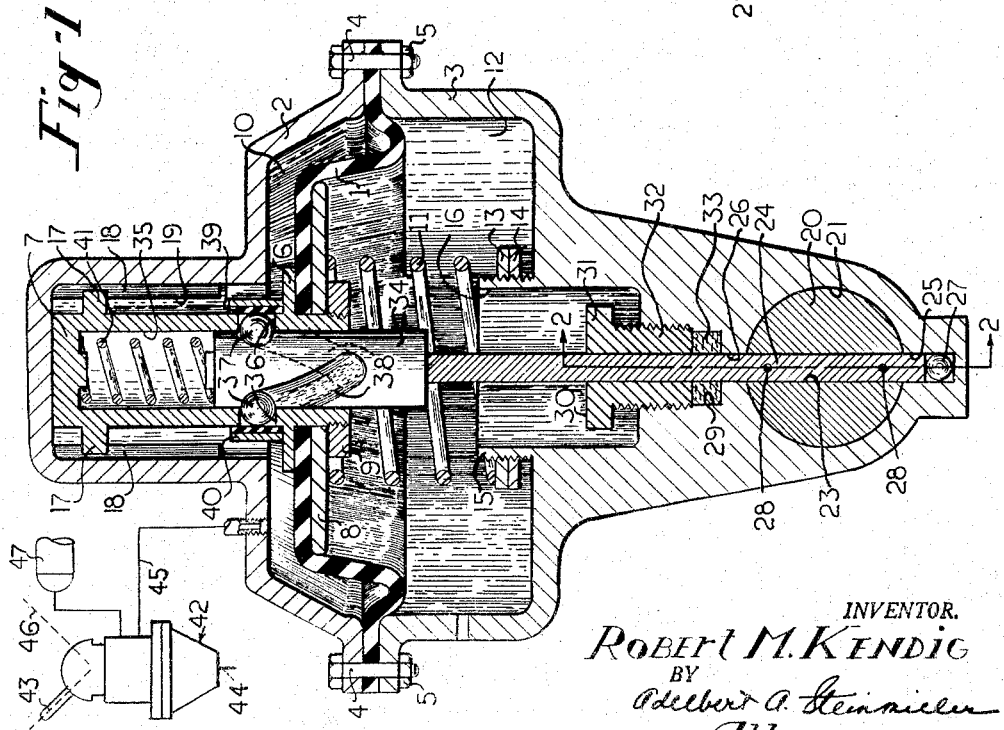
INVENTOR.
Robert M. Kendig
BY
Adelbert A. Steinmiller
Attorney

United States Patent Office 2,883,144
Patented Apr. 21, 1959

2,883,144

FLUID PRESSURE OPERATED FLOW CONTROL VALVE DEVICE

Robert M. Kendig, Trafford, Pa., assignor to Westinghouse Air Brake Company, Wilmerding, Pa., a corporation of Pennsylvania Application January 24, 1957, Serial No. 636,196

5 Claims. (Cl. 251—58)

This invention relates to valve devices and more particularly to fluid pressure operated flow control valve devices embodying rotary valves, such as butterfly valves.

Rotary valves are used to control the flow of liquids and gases through fluid pressure conveying conduits. It is well known that, with rotary valves, the flow past the valve does not vary in direct proportion to the extent of rotation of the valve from closed position through ninety degrees to full open position; more specifically, the normal flow characteristic of a butterfly valve is such that an increment of rotation of the valve from near closed toward full open position will effect a large percentage of increase in flow, whereas upon successive increments of rotation of said valve toward full open position, the percentage of increase in flow will become correspondingly less. While it has heretofore been proposed to interpose linkage arrangements between a power unit and a rotary valve for modifying the normal flow characteristic of such valve, these linkage arrangements are relatively complex, require considerable space and are not compact.

The principal object of this invention is therefore to provide a relatively simple and compact flow control valve device embodying reciprocable motor means remotely controlled by an operator selectable fluid pressure, a rotary valve for controlling flow through a conduit, and a cam and follower means interposed between said motor means and valve for so controlling the rotation of the valve that flow past the valve can be controlled in any desired relationship (such as in direct proportion) to increments of change in such selectable fluid pressure.

Other objects and advantages will become apparent from the following more detailed description of the invention and from the accompanying drawing wherein:

Fig. 1 is a vertical sectional view of a valve device, embodying the invention, and an associated operator's control valve device;

Fig. 2 is a sectional view, taken along the line 2—2 of Fig. 1; and

Fig. 3 is a graph illustrating how, with the valve device embodying the invention, the percentage of flow through a conduit may be controlled in direct proportion to the percentage of maximum operator selectable control pressure acting on the fluid pressure motor means of the valve device.

Description

As shown in Fig. 1 of the drawing, the valve device embodying the invention comprises an annular resilient diaphragm 1 clamped about its outer edge between an upper casing section 2 and a lower casing section 3, as by a plurality of bolts 4 and nuts 5. The diaphragm 1 is clamped about its inner edge between an outwardly directed overlying flange 6 on a coaxially arranged generally cylindrical member 7 and an annular follower plate 8, through the medium of a nut 9 having screw-threaded engagement with a depending, externally threaded portion of member 7, which portion extends through the central openings in the diaphragm 1 and follower plate 8.

The diaphragm 1 is subject at its upper side, as viewed in the drawing, to fluid at a selectable pressure in a control chamber 10, and is subject at its lower side to pressure of a helical spring 11 in an atmospheric chamber 12. For adjusting the degree of compression of spring 11, suitable means, such as an adjusting nut 13 and lock nut 14, are provided; said nuts having screw-threaded engagement with an externally threaded annular rib 15 formed integrally with casing section 3 and projecting toward diaphragm 1, and encircling a bore 16 that is open to chamber 12 and arranged coaxially with the diaphragm 1.

Member 7 has near its upper end a plurality of guide lugs 17, which project radially outward from said member and are adapted to ride in spaced channels or grooves 18, formed in the wall of an aligned bore 19 open to chamber 10, upon axial movement of the member 7 by the diaphragm 1; said channels extending in a direction parallel to the axis of said member and cooperating with said lugs to constrain said member and hence diaphragm 1 against rotation.

A rotary-type valve, such as a butterfly valve 20, is provided for controlling flow of fluid under pressure through a transversely extending fluid conducting conduit 21 provided in the lower end of casing section 3. As shown in Fig. 2, suitable means, such as internal pipe threads 22, are provided in the casing section 3 adjacent the respective ends of conduit 21 to adapt the valve device for connection to an inlet pipe (not shown) and to an outlet pipe (not shown).

The valve 20 has a diametral opening 23 through an enlarged central portion thereof for accommodating a shaft 24 that is arranged coaxially with the diaphragm 1; said shaft being rotatably supported within two aligned bores 25 and 26 formed in casing section 3 and extending in opposite directions from the conduit 21. A ball-type thrust bearing 27 is disposed in the lower bore 25 and engaged by the lower end of shaft 24. As best shown in Fig. 2, suitable means, such as transverse pins or rivets 28, are provided for connecting the valve 20 to the shaft 24 for rotation thereby. Bore 26 joins a larger bore 29, in the nature of a counterbore, which at its upper end is joined to the still larger bore 16.

An annular packing nut 30 surrounds the shaft 24 and has a wrench engageable portion 31 disposed with substantial radial clearance in bore 16 and an externally threaded portion 32 having screw-threaded engagement with screw threads provided near the upper end of bore 29; said nut being provided for compressing suitable packing 33 against the base and wall of bore 29 and exterior of the shaft for preventing leakage of fluid under pressure from conduit 21 to atmospheric chamber 12 along shaft 24.

Coaxially connected to the upper end of shaft 24 is a cylindrical cam member 34 which is disposed within an aligned bore 35 in the member 7 for rotary movement relative thereto. The member 7 has, intermediate the lugs 17 and flange 6, a pair of oppositely arranged diametral openings 36 through which respective follower means, preferably in the form of balls 37 are inserted, such that their inner hemispherical surfaces are disposed in corresponding cam grooves 38 formed in cam member 34, while their outer hemispherical surfaces are disposed within the openings 36. The balls 37 are maintained in this position by a resilient sealing ring 39 which is clamped, by such as a surrounding snap ring 40, into sealing contact with the outer surface of the member 7 adjacent the openings 36; said sealing ring also serving to prevent leakage of fluid under pressure from chamber 10 to atmospheric chamber 12 via the grooves 38.

The cam grooves 38 are of such configuration as to control rotation of cam member 34, and thereby the shaft 24 and valve 20, in any desired relationship for given increments of increase in control pressure in chamber 10 and consequent corresponding increments of axial movement of the diaphragm 1 and member 7 against resistance of spring 11, as will be understood from subsequent description.

A helical spring 41 is disposed within bore 35 between the enclosed upper end of member 7 and the upper end of cam member 34 for maintaining said cam member and also valve 20 in a fixed axial position defined by contact of shaft 24 with thrust bearing 27.

For controlling the pressure of fluid in the control chamber 10, an operator's self-lapping control valve device 42 is provided, which may be of any suitable type, such as shown in U.S. Patent 2,398,877, granted to A. J. Bent on April 23, 1946, and assigned to the assignee of the present invention.

The valve device 42 comprises, briefly, self-lapping valve means (not shown) operable by movement of a handle 43 to a vent position, in which it is shown, to connect, to an atmospheric vent pipe 44, a pipe 45 leading to control chamber 10; and operable by arcuate movement of said handle from vent position through a control zone to a full supply position, designated by a dot-and-dash line 46, to supply fluid at maximum available pressure from a fluid pressure source, such as a supply reservoir 47, to said pipe 45; and operable by movement of said handle to any position intermediate said vent and full supply positions to supply or release fluid under pressure from pipe 45 to such degree as may be necessary to provide in pipe 45 fluid at a pressure directly proportional to the position of said handle in said zone.

Operation

Assuming that handle 43 is in vent position, the control chamber 10 will be vented, and spring 11 will bias the diaphragm 1 and hence cylindrical member 7 to an uppermost position, defined by contact of the upper end of member 7 with the base of bore 19. Member 7, in its uppermost position, will hold the follower balls 37 in their uppermost position within the respective grooves 38, thereby defining a rotative position of cam member 34, and hence of shaft 24, in which valve 20 is in closed position.

If handle 43 is now moved from vent position to its full supply position 46, fluid at maximum available pressure will be supplied via pipe 45 to control chamber 10 for deflecting diaphragm 1 downwardly against resistance of spring 11 and thereby carrying member 7 to a lower most position. During this movement of member 7 to its lowermost position, lugs 17 will ride in the channels 18 and thereby constrain the diaphragm 1 and member 7 against rotation and twisting; the follower balls 37 will be carried downward and, as a result of their confinement within grooves 38, cause cam member 34 and hence shaft 24 to be rotated ninety degrees in a clockwise direction, as viewed from the top of the valve device, and thereby rotate valve 20 to its fully open position, which will be attained when the balls 37 have reached the bottom of grooves 38.

If handle 43 is moved to any position within the control zone intermediate vent position and full supply position, fluid will be provided in pipe 45 and hence in control chamber 10 at a pressure proportionate to the maximum available control pressure and corresponding to the position of said handle in said control zone. Diaphragm 1 will be deflected against resistance of spring 11 to an extent corresponding to the pressure in chamber 10 and thereby axially shift the member 7 a corresponding extent to a position intermediate its uppermost and lowermost positions. As member 7 is thus shifted, lugs 17 will ride in the channels 18 and prevent rotation of said member, and follower balls 37 will be axially shifted and thereby, through the medium of the grooves 38, rotate the cam member 34 and hence the shaft 24 and valve 20 to a position then determined by the configuration of the grooves.

It will now be seen that it is possible, with the valve device embodying the invention, to provide a cam member 34 having cam grooves 38 of such configuration as to so control the degree of rotation of valve 20, according to increments of change of control pressure and hence of axial movement of member 7, that any desired relationship may be obtained between control pressure and flow of fluid under pressure past valve 20. For example, the grooves 38 may be of such configuration as to control the percentage of flow past valve 20 in direct proportion to the percentage of maximum available control pressure, as is illustrated by the line 48 in Fig. 3 of the drawing, despite the fact that the percentage of total flow past the valve 20 is not directly proportional to the degree of rotation thereof from closed position. In other words, since an initial slight, such as ten percent, rotation of butterfly valve 20 from closed position toward open position will result in more than ten percent of the total flow, the cam grooves 38 would be of such configuration (if direct proportionality between percentages of maximum available control pressure and percentage of total flow through the conduit 21 is desired) that the initial ten percent of the maximum available control pressure would cause the valve 20 to rotate somewhat less than ten percent of its ninety degree range in order to assure that flow past the valve 20 would be held to ten percent of the total flow.

It is to be understood that the spring 11 is of such preselected value, in relation to the range of control pressures obtainable in control chamber 10 by operation of valve device 42, that the maximum available control pressure (and nothing less) will be necessary in chamber 10 to shift the diaphragm and hence member 7 to lowermost position against resistance of spring 11. In other words, if the range of control pressures obtainable by the valve device 42 is from 0 to 50 p.s.i., the spring 11 should be of such value that the member 7 and hence follower balls 37 will not assume their lowermost positions unless pressure in chamber 10 is 50 p.s.i. And conversely, if the spring 11 is of such value as to impose a maximum bias equal to the effect of a 20 p.s.i. control pressure acting on diaphragm 1, then the valve device 42 should be adjusted to provide a range of control pressures between 0 and 20 p.s.i.

Having now described the invention, what I claim as new and desire to secure by Letters Patent, is:

1. A pressure-responsive controller in combination with a rotary valve that controls fluid flow through a conduit, said pressure-responsive controller comprising casing means providing a control chamber constantly closed off from the conduit and chargeable by an operator with fluid at any selectable pressure between a minimum value and a maximum value, a helical spring, movable abutment means reciprocably operable in said casing means and subject opposingly to pressure of fluid in said control chamber and to pressure of said spring, means operatively connecting said movable abutment means with said casing means for constraining said movable abutment means against rotation, cam means having a cam groove and arranged coaxially with said movable abutment means and operatively connected to the valve for controlling rotation thereof, means carried by said movable abutment means and operable in said cam groove for operatively connecting said movable abutment means with said cam means, said cam groove being of such configuration that said cam means will be rotated by the last-introduced means upon reciprocating movement of said movable abutment means for thereby so controlling the rotative position of the valve as to cause flow of fluid past the valve to be varied in a straight line relation with changes in control chamber pressure between its said minimum and maximum values.

2. A pressure-responsive controller in combination with a rotary valve that controls flow of fluid through a conduit, said pressure-responsive controller comprising a casing providing a control chamber constantly closed off from the conduit and chargeable by an operator with fluid at a selectable pressure or ventable to atmosphere and also providing an atmospheric chamber, a helical spring disposed in said atmospheric chamber, a bore formed in the end wall of said control chamber and enclosed at its inner end and having at least one axially extending channel in the wall thereof, an annular movable abutment arranged coaxially with said bore and subject opposingly to pressure of fluid in said control chamber and to pressure of said helical spring, a generally cylindrical hollow member coaxially connected to said movable abutment and axially movable in said bore and enclosed at its end nearest said inner end of said bore, said member having for each channel a lug extending radially outward therefrom and operable within such channel for constraining said member and annular movable abutment against rotation while permitting axial movement thereof, a cam member rotatably disposed within said cylindrical member and arranged coaxially with said movable abutment and positively coupled to the valve for controlling rotation thereof, said cam member having a cam groove, and follower means carried by said cylindrical hollow member and operable in said cam groove for effecting rotation of said cam member upon reciprocating movement of said movable abutment, said cam groove being of such configuration that when said control chamber is vented said cam member will be rotated by said follower means to one limit position for causing closure of the valve, and when said control chamber is charged to a certain selected pressure said cam member will be rotated by said follower means to another limit position for causing the valve to be fully opened, and when said control chamber is charged to any pressure intermediate atmospheric and said certain selected pressure said cam member will be rotated by said follower means to a corresponding position intermediate its said limit positions to limit flow past the valve to substantially the same percentage of its maximum flow as the percentage that such intermediate pressure is of said certain selected pressure.

3. Means in combination with a rotary valve that controls flow of fluid through a conduit, said means comprising casing means providing a control chamber constantly closed off from the conduit and chargeable by an operator with fluid at a selectable pressure or ventable to atmosphere, a helical spring, movable abutment means reciprocably operable in said casing means and subject opposingly to pressure of fluid in said control chamber and to pressure of said spring, means operatively connecting said movable abutment means with said casing means for constraining said movable abutment means against rotation, cam means arranged coaxially with said movable abutment means and positively coupled to the valve for controlling rotation thereof, said cam means having a cam groove, and means carried by said movable abutment means and operable in said cam groove for effecting rotation of said cam means upon reciprocating movement of said movable abutment means, said cam groove being of such configuration that when said control chamber is vented said cam means will be rotated to one limit position for causing closure of the valve, and when said control chamber is charged to a certain selected pressure said cam means will be rotated to another limit position for causing the valve to be fully opened, and when said control chamber is charged to any pressure intermediate atmospheric and said certain selected pressure said cam means will be rotated to a corresponding position intermediate its said limit positions to limit flow past the valve to substantially the same percentage of its maximum flow as the percentage that such intermediate pressure is of said certain selected pressure.

4. A fluid pressure operated flow control valve device comprising casing means having a fluid conveying conduit connectable to an inlet and an outlet and also having a control chamber constantly closed off from the conduit and chargeable by an operator with fluid at any selectable pressure between a minimum value and a maximum value, valve means rotatably mounted in said casing means for controlling flow of fluid under pressure through said conduit, a helical spring, movable abutment means arranged coaxially with the axis of rotation of said valve means and reciprocably operable in said casing means and subject opposingly to pressure of fluid in said control chamber and to pressure of said spring, means operatively connecting said movable abutment means with said casing means for constraining said movable abutment means against rotation, cam means having a cam groove and arranged coaxially with said movable abutment means and operatively connected to said valve means for controlling rotation thereof, means carried by said movable abutment means and operable in said cam groove for operatively connecting said movable abutment means with said cam means, said cam groove being of such configuration that upon reciprocating movement of said movable abutment means said cam means will be so rotated by the last-introduced means as to control the rotative position of said valve means in such manner as to cause flow of fluid past said valve means to be varied in a straight line relation with changes in control chamber pressure between its said minimum and maximum values.

5. A fluid pressure operated flow control valve device comprising casing means having a fluid conveying conduit connectable to an inlet and an outlet and also having a control chamber constantly closed off from said conduit and chargeable by an operator with fluid at a selectable pressure or ventable to atmosphere, valve means rotatably mounted in said casing means for controlling flow of fluid under pressure through said conduit, a helical spring, movable abutment means reciprocably operable in said casing means and subject opposingly to pressure of fluid in said control chamber and to pressure of said spring, means operatively connected to said movable abutment means and said casing means for constraining said movable abutment means against rotation, cam means arranged coaxially with said movable abutment means and positively coupled to said valve means for controlling rotation thereof, said cam means having a cam groove, and means carried by said movable abutment means and operable in said cam groove for effecting rotation of said cam means upon reciprocating movement of said movable abutment means, said cam groove being of such configuration that when said control chamber is vented said cam means will be rotated by the last-introduced means to one limit position for causing closure of said valve means, and when said control chamber is charged to a certain selected pressure said cam means will be rotated by said last-introduced means to another limit position for causing said valve means to be fully opened, and when said control chamber is charged to any pressure intermediate atmospheric and said certain selected pressure said cam means will be rotated by said last-introduced means to a corresponding position intermediate its said limit positions to limit flow past said valve means to substantially the same percentage of its maximum flow as the percentage that such intermediate pressure is of said certain selected pressure.

References Cited in the file of this patent

UNITED STATES PATENTS

| | | |
|---|---|---|
| 623,873 | Borden | Apr. 25, 1899 |
| 965,009 | Philbrick | July 19, 1910 |
| 2,082,940 | Brisbane et al. | June 8, 1937 |
| 2,200,010 | Orem | May 7, 1940 |

FOREIGN PATENTS

| | | |
|---|---|---|
| 26,269 | Switzerland | July 10, 1902 |
| 241,299 | Great Britain | Oct. 22, 1925 |